(12) United States Patent
Tanaya et al.

(10) Patent No.: US 8,701,629 B2
(45) Date of Patent: Apr. 22, 2014

(54) INTERNAL-COMBUSTION-ENGINE COMBUSTION STATE DETECTING APPARATUS

(75) Inventors: Kimihiko Tanaya, Chiyoda-ku (JP); Takahiko Inada, Chiyoda-ku (JP); Yumi Takaoka, Aioi (JP); Takeshi Koda, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 899 days.

(21) Appl. No.: 12/640,983

(22) Filed: Dec. 17, 2009

(65) Prior Publication Data

US 2010/0258081 A1   Oct. 14, 2010

(30) Foreign Application Priority Data

Apr. 9, 2009 (JP) ................... 2009-094911

(51) Int. Cl.
*G01L 23/22* (2006.01)
*F02P 17/12* (2006.01)
*G01M 15/11* (2006.01)

(52) U.S. Cl.
USPC ............... 123/406.14; 123/406.16; 73/35.08; 73/114.08

(58) Field of Classification Search
USPC ............ 123/406.12, 406.14, 406.16, 406.26; 73/35.08, 114.08
See application file for complete search history.

(56) References Cited

U.S. PATENT DOCUMENTS

| | | | | |
|---|---|---|---|---|
| 5,207,200 A * | 5/1993 | Iwata | ................ | 123/406.14 |
| 5,751,147 A * | 5/1998 | Nakata et al. | ................ | 324/399 |
| 5,781,012 A * | 7/1998 | Yasuda | ................ | 324/399 |
| 6,020,742 A * | 2/2000 | Kano et al. | ................ | 324/399 |
| 6,230,546 B1 * | 5/2001 | Wilstermann et al. | ....... | 73/35.08 |
| 6,281,682 B1 * | 8/2001 | Kameda et al. | ................ | 324/391 |
| 6,378,494 B1 * | 4/2002 | Hatazawa et al. | ........ | 123/406.39 |
| 6,418,785 B1 * | 7/2002 | Hatazawa et al. | ............ | 73/35.08 |
| 6,925,374 B2 * | 8/2005 | Matsushita et al. | ........... | 701/114 |
| 7,451,640 B2 * | 11/2008 | Asano et al. | ................ | 73/114.67 |
| 7,581,534 B2 * | 9/2009 | Aida et al. | ................ | 123/644 |
| 7,624,717 B2 * | 12/2009 | Inada et al. | ............. | 123/406.12 |
| 7,673,614 B2 * | 3/2010 | Inada et al. | ............. | 123/406.26 |
| 7,789,595 B2 * | 9/2010 | Tanaya | ........................ | 406/13 |
| 7,882,730 B2 * | 2/2011 | Tanaya et al. | ............. | 73/114.67 |
| 7,966,992 B2 * | 6/2011 | Glugla et al. | ................ | 123/434 |

(Continued)

FOREIGN PATENT DOCUMENTS

| | | | |
|---|---|---|---|
| JP | 11-13620 A | 1/1999 | |
| JP | 2003-83222 A | 3/2003 | |

(Continued)

*Primary Examiner* — Mahmoud Gimie
*Assistant Examiner* — David Hamaoui
(74) *Attorney, Agent, or Firm* — Sughrue Mion, PLLC

(57) ABSTRACT

There is provided a combustion state detecting apparatus capable of detecting combustion-state abnormality in an internal combustion engine. A comparison timing is set to be advanced in terms of the rotation angle of the crankshaft of an internal combustion engine with respect to the ending timing of an electric quantity based on an ion that occurs when ignition is performed normally through a predetermined ignition signal among the plurality of ignition signals; in the case where, as a result of the comparison between the detected ending timing of an electric quantity based on an ion and the comparison timing, the ending timing is advanced in terms of the rotation angle of the crankshaft with respect to the comparison timing, it is determined that the combustion based on ignition through the predetermined ignition signal is abnormal.

10 Claims, 4 Drawing Sheets

(56) References Cited

U.S. PATENT DOCUMENTS

| | | | |
|---|---|---|---|
| 8,291,747 B2* | 10/2012 | Tanaya | 73/35.08 |
| 2003/0097870 A1* | 5/2003 | Honda | 73/35.08 |
| 2008/0028842 A1* | 2/2008 | Asano et al. | 73/116 |

FOREIGN PATENT DOCUMENTS

| | | |
|---|---|---|
| JP | 2006-046140 A | 2/2006 |
| JP | 2006-96166 A | 4/2006 |
| JP | 2009-57940 A | 3/2009 |

* cited by examiner

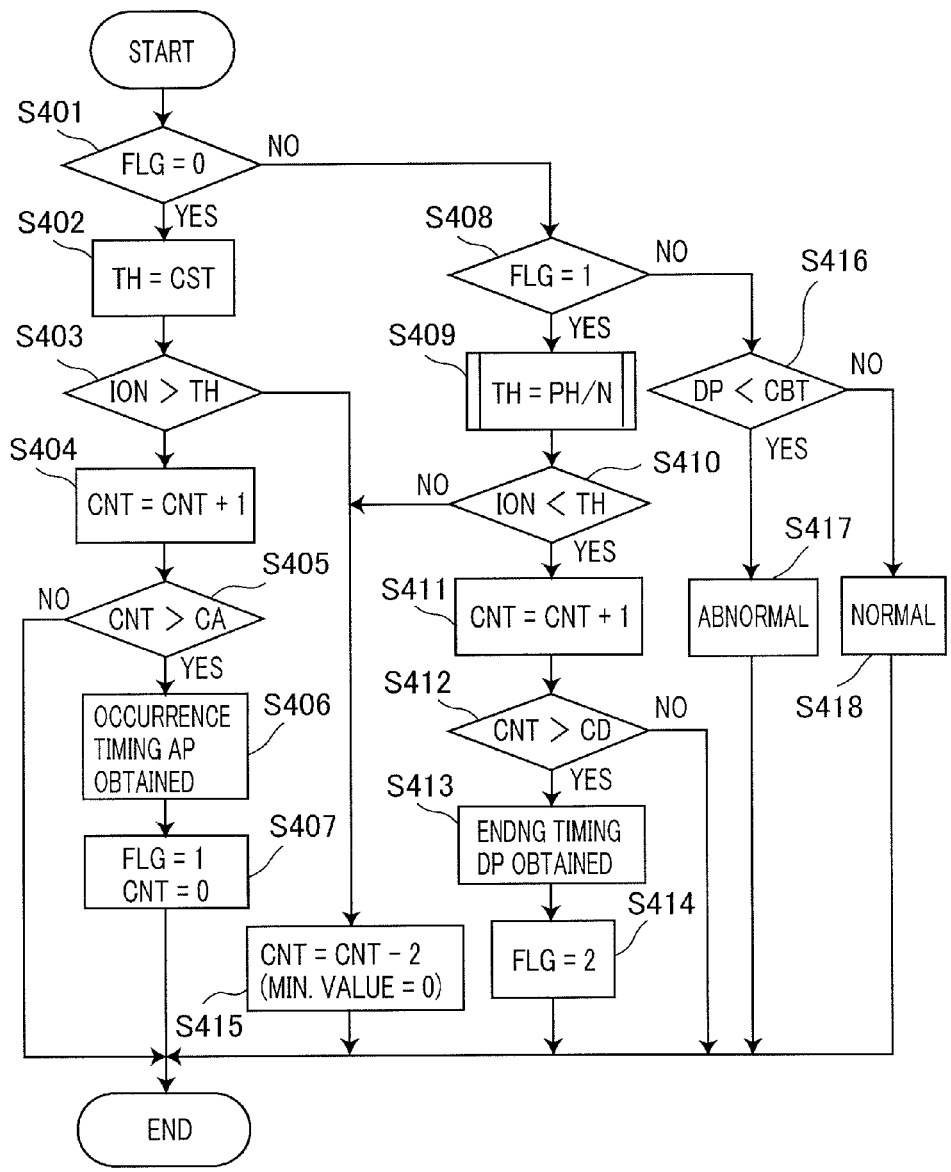

INTERNAL-COMBUSTION-ENGINE COMBUSTION STATE DETECTING APPARATUS

BACKGROUND OF THE INVENTION

1. Field of the Invention

The present invention relates to an internal-combustion-engine combustion state detecting apparatus that is capable of detecting abnormal combustion in an internal combustion engine.

2. Description of the Related Art

In recent years, problems of environmental conservation and fuel depletion have been raised, and in the automobile industry, solutions to these problems have also become big issues. As solutions to the foregoing problems, many technologies that intend to raise the efficiency of an engine as much as possible have been developed. However, on the contrary, the occurrence frequency of abnormal combustion has been raised and hence problems such as damage to an engine and deterioration in the durability and merchantability have occurred.

To date, as an apparatus for detecting abnormal combustion in an internal combustion engine, there has been proposed an apparatus that determines that there exists abnormal combustion in the case where the position of the peak cylinder pressure of the internal combustion engine is more advanced than a predetermined crank angle position (for example, refer to Japanese Patent Application Laid-Open No. 2006-46140). In the conventional apparatus disclosed in Japanese Patent Application Laid-Open No. 2006-46140, the detection of the peak position is performed by utilizing an ion current that is obtained by applying a voltage to ions produced due to combustion of an inflammable fuel-air mixture.

In the conventional apparatus disclosed in Japanese Patent Application Laid-Open No. 2006-46140, the peak position of the cylinder inner pressure can be estimated from an ion current; however, because the peak position, of the cylinder inner pressure, which occurs as a result of abnormal combustion is in fact located at a position immediately before or after ignition, and particularly in the case of at a position immediately after the ignition, the peak position is likely to be located in a period of spark discharge caused by ignition, no ion current can be detected during the spark discharge, whereby there has been a problem that the peak position of the cylinder inner pressure cannot be detected.

Even though detection of an ion current can become possible from a timing immediately after ignition, it has been difficult to distinguish an ion current peak timing, represented by a flame angle, which is created through ignition operation, from a cylinder inner pressure peak timing.

SUMMARY OF THE INVENTION

The present invention has been implemented in order to solve the foregoing problem in a conventional apparatus; the purpose thereof is to provide an internal-combustion-engine combustion state detecting apparatus that can accurately detect abnormal combustion and hence can contribute to solving the fuel depletion problem and to the environmental conservation.

An internal-combustion-engine combustion state detecting apparatus according to the present invention is characterized by including an ignition device that generates a plurality of ignition signals during a single compression stroke or power stroke of an internal combustion engine so as to ignite and burn an inflammable fuel-air mixture taken in into a combustion chamber in a cylinder of the internal combustion engine; an ion detection device that is provided in the ignition device and detects an electric quantity based on an ion that occurs in the combustion chamber due to combustion of the fuel-air mixture; an ending timing detection device that detects an ending timing of the detected electric quantity; a comparison timing device that sets a comparison timing; and a combustion diagnosis device that compares the detected ending timing with the set comparison timing and then diagnoses a combustion state of the internal combustion engine, based on the result of the comparison, and characterized in that the comparison timing is set in such a way as to be advanced in terms of the rotation angle of a crankshaft of the internal combustion engine with respect to the ending timing of an electric quantity based on an ion that occurs when ignition is performed normally through a predetermined ignition signal among the plurality of ignition signals; and in that, in the case where, as a result of the comparison between the detected ending timing and the set comparison timing, it is determined that the detected ending timing is advanced in terms of the rotation angle of the crankshaft with respect to the comparison timing, the combustion diagnosis device determines that the combustion based on ignition through the predetermined ignition signal is abnormal.

Moreover, in the internal-combustion-engine combustion state detecting apparatus according to the present invention, the predetermined ignition signal is preferably an ignition signal, among the plurality of ignition signals, that firstly occurs.

Still moreover, in the internal-combustion-engine combustion state detecting apparatus according to the present invention, the ending timing device is preferably configured in such a way as to be provided with an occurrence detection device for detecting occurrence of the electric quantity and not to detect the ending timing of the electric quantity unless the occurrence detection device detects occurrence of the electric quantity.

Furthermore, in the internal-combustion-engine combustion state detecting apparatus according to the present invention, the ending timing device is preferably provided with a masking device that masks the electric quantity at a timing close to an energization starting timing when supply of a primary current to an ignition coil device provided in the ignition device is started and the electric quantity at a timing close to an ignition timing when the primary current is shut off and the ignition is performed, and detects the ending timing, based on an electric quantity other than the masked electric quantity.

Moreover, in the internal-combustion-engine combustion state detecting apparatus according to the present invention, the ending timing device is preferably provided with a level comparison device that sets a comparison level to be compared with the electric quantity, and adopts a timing when the electric quantity becomes lower than the set comparison level, as the ending timing of the electric quantity.

Still moreover, in the internal-combustion-engine combustion state detecting apparatus according to the present invention, the level comparison device preferably sets a comparison level in accordance with a peak hold value of the electric quantity.

Furthermore, in the internal-combustion-engine combustion state detecting apparatus according to one aspect of the present invention, the comparison timing device preferably sets the comparison timing as a timing relative to an ignition timing based on the predetermined ignition signal.

Still moreover, in the internal-combustion-engine combustion state detecting apparatus according to the present invention, in the case where the ignition timing based on the predetermined ignition signal is advanced in terms of the rotation angle of the crankshaft with respect to a predetermined ignition timing, the combustion diagnosis device preferably prohibits the diagnosis of a combustion state.

Moreover, in the internal-combustion-engine combustion state detecting apparatus according to the present invention, the combustion diagnosis device is preferably provided with a leakage diagnosis device that determines, in order to detect the ion, whether or not there exists leakage of energy that is applied across the electrodes of an ignition plug, and prohibits the diagnosis of a combustion state in the case where the leakage diagnosis device determines that there exists leakage to the point where the level thereof exceeds a predetermined level.

Still moreover, in the internal-combustion-engine combustion state detecting apparatus according to the present invention, the combustion diagnosis device is preferably provided with a foreign material diagnosis device that determines whether or not there exists a foreign material, in the inflammable fuel-air mixture, that makes the electric quantity increase, and prohibits the diagnosis of a combustion state in the case where the foreign material diagnosis device determines that there exists the foreign material to the point where the amount thereof exceeds a predetermined amount.

An internal-combustion-engine combustion state detecting apparatus according to the present invention is provided with an ignition device that generates a plurality of ignition signals during a single compression stroke or power stroke of an internal combustion engine so as to ignite and burn an inflammable fuel-air mixture taken in into a combustion chamber in a cylinder of the internal combustion engine; an ion detection device that is provided in the ignition device and detects an electric quantity based on an ion that occurs in the combustion chamber due to combustion of the fuel-air mixture; an ending timing detection device that detects an ending timing of the detected electric quantity; a comparison timing device that sets a comparison timing; and a combustion diagnosis device that compares the detected ending timing with the set comparison timing and then diagnoses a combustion state of the internal combustion engine, based on the result of the comparison, and characterized in that the comparison timing is set in such a way as to be advanced in terms of the rotation angle of a crankshaft of the internal combustion engine with respect to the ending timing of an electric quantity based on an ion that occurs when ignition is performed normally through a predetermined ignition signal among the plurality of ignition signals; and in that, in the case where, as a result of the comparison between the detected ending timing and the set comparison timing, it is determined that the detected ending timing is advanced in terms of the rotation angle of the crankshaft with respect to the comparison timing, the combustion diagnosis device determines that the combustion based on ignition through the predetermined ignition signal is abnormal. As a result, the internal-combustion-engine combustion state detecting apparatus can accurately detect abnormal combustion and hence can contribute to solving the fuel depletion problem and to the environmental conservation.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 4 is a flowchart representing the operation of an internal-combustion-engine combustion state detecting apparatus according to Embodiment 1 of the present invention.

DETAILED DESCRIPTION OF THE PREFERRED EMBODIMENTS

Embodiment 1

Figure 1:
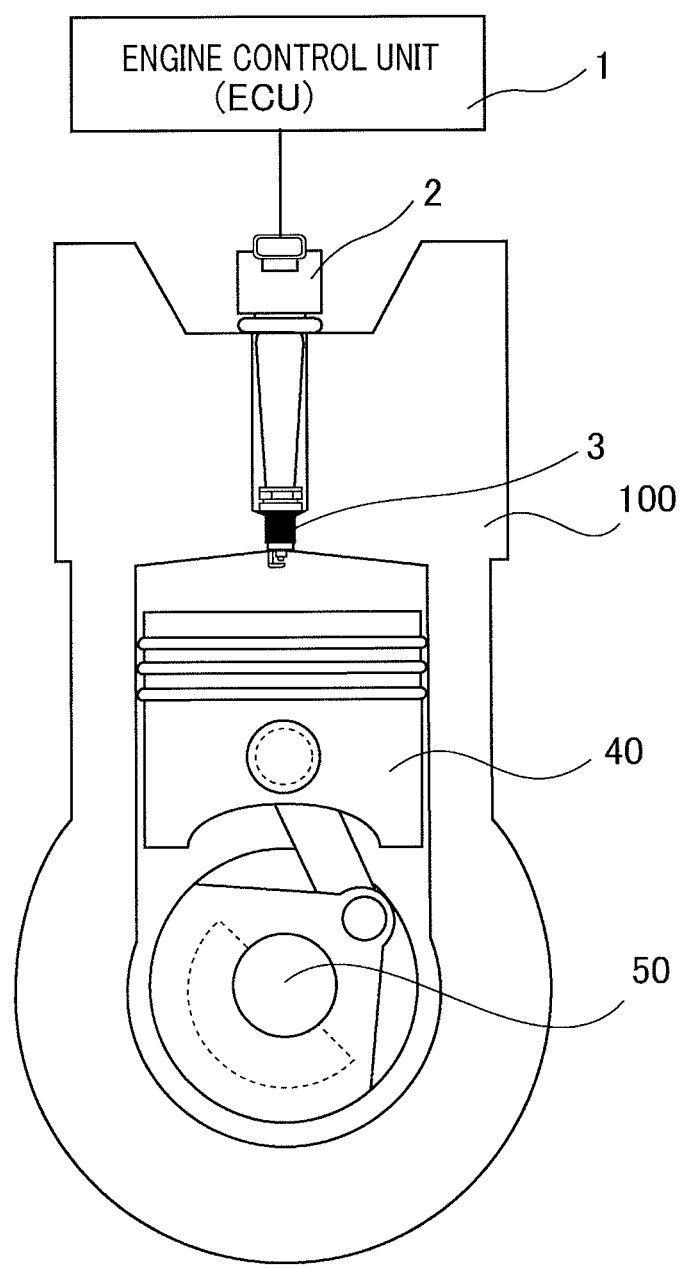
FIG. 1 is a configuration diagram illustrating the configuration of an internal combustion engine to which an internal-combustion-engine combustion state detecting apparatus according to Embodiment 1 of the present invention is applied.
Figure 2:
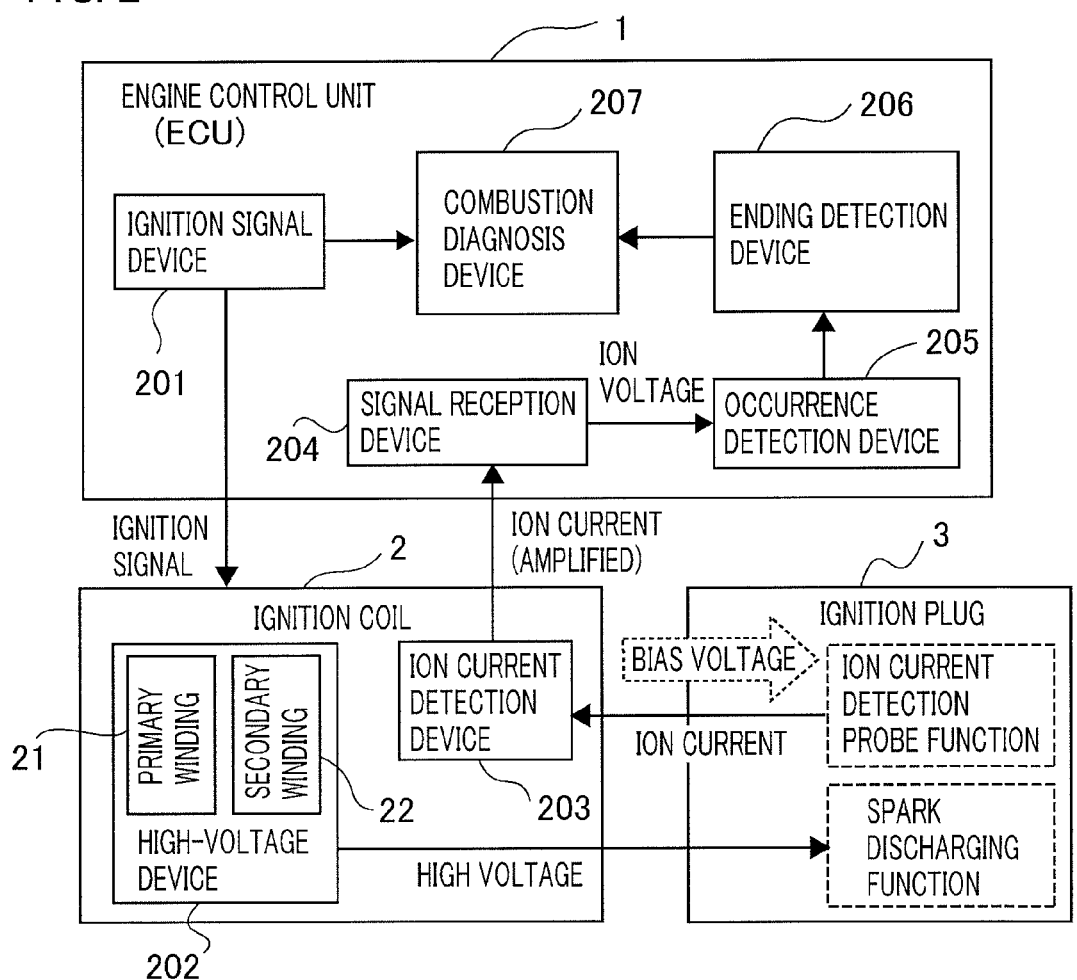
FIG. 2 is a block diagram illustrating the configuration of an internal-combustion-engine combustion state detecting apparatus according to Embodiment 1 of the present invention.

An internal-combustion-engine combustion state detecting apparatus according to Embodiment 1 of the present invention will be explained below. FIG. 1 is a configuration diagram illustrating the configuration of an internal combustion engine to which an internal-combustion-engine combustion state detecting apparatus according to Embodiment 1 of the present invention is applied; FIG. 2 is a block diagram illustrating the configuration of an internal-combustion-engine combustion state detecting apparatus according to Embodiment 1 of the present invention. In FIGS. 1 and 2, an ignition plug 3 connected with an ignition coil device 2 is provided at the top portion of a cylinder 100 of an internal combustion engine; inside the cylinder 100, there is contained a piston 40 coupled with a crankshaft 50.

The ignition plug 3 has a first electrode as a main electrode to which an ignition voltage for producing a spark discharge and a bias voltage described later are applied and a second electrode that faces the first electrode through a gap and is maintained to the ground potential; the ignition voltage is applied across these electrodes so that a spark discharge is produced and an inflammable fuel-air mixture in a combustion chamber is ignited (simply referred to as ignition, hereinafter) to burn.

The ignition coil device 2 is mechanically integrated with the ignition plug 3 and provided with a primary wiring 21 connected with a power source formed of a battery, a secondary winding 22 coupled with the primary wiring 21 by the intermediary of a magnetic iron core, and an ion current detection device 203. A high-voltage device 202 in the ignition coil device 2 is configured with the primary wiring 21 and the secondary winding 22. The ignition coil device 2 and the ignition plug 3 configure an ignition device provided with an ion detection device.

An ignition signal device 201 in an engine control unit (referred to as an ECU, hereinafter) 1 outputs an ignition signal, described later, at a timing when the ignition coil device 2 is activated. When the ignition signal becomes to be a high level (referred to as H level, hereinafter), a primary current, described later, flows in the primary wiring 21 in the ignition coil device 2, and hence the ignition coil device 2 starts to accumulate energy; at the ignition timing when the ignition signal turns from H level to a low level (referred to as L level, hereinafter), a high voltage is produced across the secondary winding 22. The high voltage generated across the secondary winding 22 is conveyed to the first electrode of the ignition plug 3; a spark discharge is produced through a dielectric breakdown between the first electrode and the second electrode; and there is caused combustion of the inflammable fuel-air mixture in the combustion chamber of the cylinder 100.

Due to the spark discharging operation of the ignition plug 3, the ion current detection device 203 provided in the ignition coil device 2 generates a bias voltage as electric energy for detecting ions produced through combustion of the inflammable fuel-air mixture in the combustion chamber, for example, a constant voltage of approximately 100 V, and supplies the bias voltage to the ignition plug 3 after the spark discharging operation. The bias voltage is generated based on the supply voltage from the battery (unillustrated) and applied across the electrodes of the ignition plug 3.

The ignition plug 3 has a function as an ion current detection probe in addition to the spark discharging function; when the foregoing bias voltage is applied across the first electrode and the second electrode of the ignition plug 3, there is produced an ion current as an electric quantity based on ions that are generated due to combustion of the inflammable fuel-air mixture. The ion current generated through the bias voltage applied across the electrodes of the ignition plug 3 is detected and amplified by the ion current detection device 203 and then transferred to a signal reception device 204 in the ECU 1.

The signal reception device 204 converts the received ion current into an ion signal as an electric quantity in the form of a voltage that can be processed by a microcomputer. The ion signal is transferred to a combustion diagnosis device 207 by way of an occurrence detection device 205 and an ending detection device 206. The combustion diagnosis device 207 also receives ignition information from the ignition signal device 201 and diagnoses a combustion state, based on the information and the ion signal.

The signal reception device 204 controls a rate for converting the ion current into a voltage signal, and converts the ion current into an ion signal, based on the rate. For example, in general, the ion signal is treated by an AD converter so as to be processed by a microcomputer. The signal reception device 204 converts an ion current into a voltage value of 0 V to 5 V; however, when an internal combustion engine rotates at high speed, for example, the ion current becomes large; therefore, if the conversion rate is constant, the ion signal becomes as large as a voltage of 5 V, and hence becomes a signal that is saturated at 5 V. Accordingly, the signal reception device 204 is provided with a function of monitoring the saturation state of this signal and lowering the current/voltage rate so that the signal is not saturated, when it is determined that the signal frequently becomes saturated.

In the case where the signal cannot be prevented from being saturated even though the conversion rate is lowered, for example, in the case where the ion signal with a level (e.g., 5 V) that leads to saturation frequently occurs immediately after the ignition signal becomes H level, the combustion diagnosis device 207 determines that there exists a large-current leakage path in the route for detecting an ion, and prohibits the diagnosis of combustion. Alternatively, in the case where the ion signal, which is detected after a spark discharge by the ignition plug 3, continually occurs, the combustion diagnosis device 207 determines that an abnormally large amount of alkali-metal material has mixed with the fuel, and prohibits the diagnosis of combustion.

The voltage to be applied, for detecting an ion, to the signal reception device 204 largely changes depending on whether the ignition signal is in the state of H level or in the state of L level; therefore, the foregoing conversion rate may be switched depending on whether the ignition signal is in the state of H level or in the state of L level.

Figure 3:
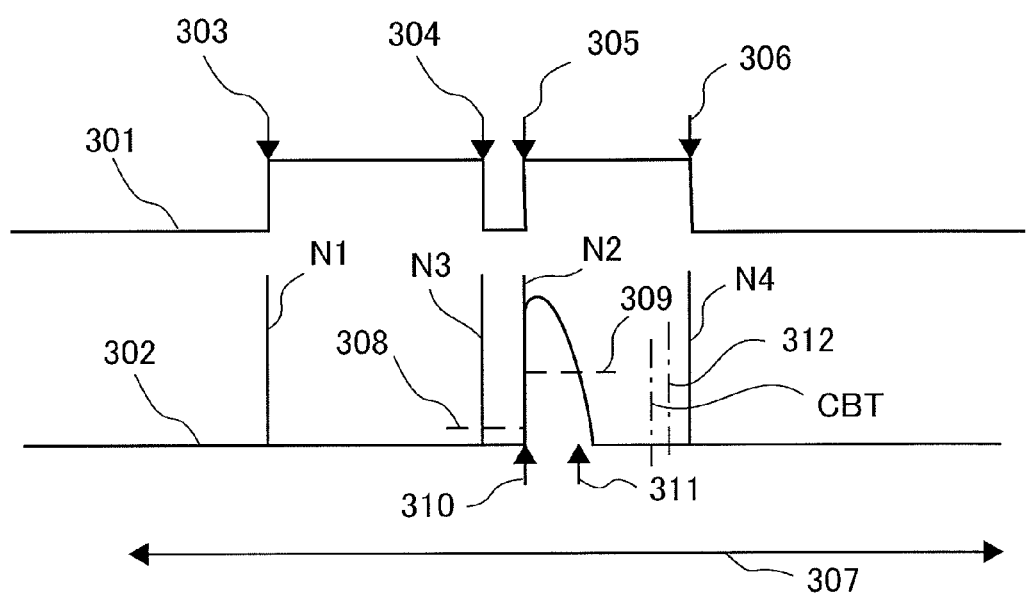
FIG. 3 is a timing chart for explaining the operation of an internal-combustion-engine combustion state detecting apparatus according to Embodiment 1 of the present invention.

Next, the specific processing of combustion diagnosis will be explained. FIG. 3 is a timing chart for explaining the operation of an internal-combustion-engine combustion state detecting apparatus according to Embodiment 1 of the present invention; the abscissa denotes the crank angle or the time. In FIG. 3, reference numeral 301 denotes an ignition signal that is fed to the ignition coil device 2 by the ignition signal device 201; reference numeral 302 denotes an ion signal obtained by converting an ion current into a voltage value by the signal reception device 204; FIG. 3 represents a case where ignition is abnormal, i.e., combustion is abnormal, which is described later.

Reference numeral 308 denotes a threshold value (TH=CST) for detecting the occurrence of an ion signal; Reference numeral 309 denotes a threshold value (TH=PH/N) for detecting the ending of an ion signal; reference numeral 312 denotes a timing when the ion signal becomes the same as or smaller than TH (=PH/N) in the case where ignition is normally performed at a first ignition timing 304 and the inflammable fuel-air mixture normally burns; reference character CBT denotes a comparison timing that is set by a comparison timing device (unillustrated) provided in the ECU 1, for example, in the combustion diagnosis device 207. These threshold values and the comparison timing will be described later.

A first energization starting timing 303 is a main energization starting timing when there is started energization of a primary current that flows in the primary wiring 21 of the high-voltage device 202; a second energization starting timing 305 is a subordinate energization starting timing when there is started energization of a primary current that flows in the primary wiring 21 of the high-voltage device 202. A first ignition timing 304 is a main ignition timing when there is shut off a primary current that flows in the primary wiring 21 of the high-voltage device 202; a second ignition timing 306 is a subordinate ignition timing when there is shut off a primary current that flows in the primary wiring 21 of the high-voltage device 202. A period 307 in which detection and processing of the ion signal 302 is performed is set in such a way as to include the first energization starting timing 303, which is the first energization starting timing, and the second ignition timing 306, which is the last ignition timing.

As illustrated in FIG. 3, in order to raise the combustion diagnosis performance, the ignition signal device 201 supplies a multi-ignition signal 301 to the ignition coil device 2. In this case, as described above, the main ignition timing is the first ignition timing 304, and a spark discharge that occurs at the second ignition timing 306 is substantially a wasteful spark. At the second energization starting timing 305 that is a predetermined time, for example, approximately 50 μs to 500 μs after the first ignition timing 304, the supply of the primary current is started again, so that a spark discharge produced at the first ignition timing 304 can be forcibly ended at the second energization starting timing 305; therefore, even though noise occurs, the ion signal 302 can be detected at the second energization starting timing 305 or later.

Because the combustion speed of abnormal combustion to be detected is very high, the ion signal 302 that represents the combustion state in the vicinity of the first electrode, which is the main electrode of the ignition plug 3, occurs for an extremely short time, as represented in FIG. 3. Accordingly, there has been a problem that, in the case where abnormal combustion occurs during a spark discharging period in which the ion signal 302 cannot be detected, it is difficult to detect the abnormal combustion.

However, in the internal-combustion-engine combustion state detecting apparatus according to Embodiment 1 of the present invention, as described above, the supply of the primary current is started again at the second energization starting timing 305 so that a spark discharging period is forcibly ended; therefore, the foregoing problem can be solved. Accordingly, even in the case where the voltage required for producing a spark discharge is large and hence it is required to apply large energy to the ignition coil device 2 by use of an ignition coil characterized by causing a long spark discharge, abnormal combustion can be detected.

Next, combustion diagnosis processing for detecting abnormal combustion will be explained. FIG. 4 is a flowchart representing the operation of an internal-combustion-engine combustion state detecting apparatus according to Embodiment 1 of the present invention; the process represented in the flowchart is repeated every predetermined time. In the detection period 307 for the ion signal 302, at the first energization starting timing 303 for the primary current, at the second energization starting timing 305 for the primary current, at the first ignition timing 304, and at the second ignition timing 306, impulse-like noise signals N1, N2, N3, and N4, as illustrated in FIG. 3, and ringing noise accompanying the impulse-like noise signal may occur; therefore, at first, the ion signal is masked in the respective predetermined periods that are approximately 300 μs to 500 μs after the foregoing timings, so that the ion signal is preliminarily removed in the predetermined periods before occurrence detection processing, ending detection processing, and combustion diagnosis processing, described later, are performed.

In FIG. 4, at first, a flag (referred to as FLG, hereinafter) is checked in the step S401. FLG is a flag that is set to "1" when the occurrence of the ion signal 302 (referred to as ION, hereinafter) has been detected, and that is set to "2" when the occurrence and the ending of ION have been detected; the initial value thereof is set to "0".

Immediately after the start of the detection period 307, at first, it is determined in the step S401 whether or not FLG is "0"; because, as described above, the initial value of FLG is "0" (Y), the step S401 is followed by the step S402. In the step S402, a threshold value (referred to as TH, hereinafter) for detecting the occurrence of ION is set to a constant value (referred to as CST, hereinafter) in the occurrence detection device 205. The threshold value 308 (TH) in FIG. 3 is equal to CST. It is assumed that CST is a value corresponding to, for example, 4 μA. In order to be applied to ION in the form of a voltage, CST becomes a value obtained by multiplying 4 μA by the conversion rate of the signal reception device 204. If it is assumed that TH is a voltage value, the value depends on the conversion rate of the signal reception device 204; however, because it is more convenient to manage ION as a current value that does not depend on the conversion rate of the signal reception device 204, TH and the like will be described in the form of a current, hereinafter.

Next, the step S402 is followed by the step S403, where ION from which noise has been removed through masking is compared with TH (=CST); in the case where ION is larger than TH (=CST) (Y), the step S403 is followed by the step S404. In the step S404, the counter value (referred to as CNT, hereinafter) is counted up by "1", and then the step S404 is followed by the step S405. In the step S405, the occurrence detection device 205 determines whether or not CNT is larger than a comparison value (referred to as CA, hereinafter) of a counter for detecting the occurrence of ION; in the case where CNT is larger than CA, it is determined that ION has occurred, and then the step S405 is followed by the step S406, where an occurrence timing (referred to as AP, hereinafter) is obtained. After that, the step S406 is followed by the step S407, where FLG is set to "1" and CNT is reset to "0"; then, the internal-combustion-engine combustion state detecting apparatus becomes ready for the next processing cycle.

In the case where, in the step S403 described above, it is determined that ION is not larger than TH (=CST) (N), the step 403 is followed by the step S415, where "2" is subtracted from CNT, and then the internal-combustion-engine combustion state detecting apparatus becomes ready for the next processing cycle. In addition, in Embodiment 1, the amount of subtraction is "2"; this amount is a matching parameter. The minimum value of CNT is clipped at "0".

The internal-combustion-engine combustion state detecting apparatus gets into the next processing cycle; in the case where, in the step S401 described above, it is determined that FLG is not "0" (N), the step S401 is followed by the step S408, where it is determined whether or not FLG is "1". In the case where FLG is "1", the internal-combustion-engine combustion state detecting apparatus gets into a step where the ending detection device 206 detects an ending timing of ION. If TH for detecting an ending timing of ION is set in accordance with a map value for each driving condition, TH can be adjusted finely, and hence the accuracy of combustion diagnosis can be raised; however, the number of matching man-hours becomes large.

Thus, in the step S409, TH for detecting an ending timing of ION is set to one-Nth of the peak hold value PH of ION (PH/N). The threshold value 309 (TH) in FIG. 3 is equal to PH/N. As a result, the number of matching man-hours can largely be reduced, and there is demonstrated an effect in which the robustness of ion signal processing that changes depending on various kinds of factors is raised.

The step S409 is followed by the step S410, where the ending detection device 206 determines whether or not ION is the same as or smaller than TH (=PH/N); in the case where ION is smaller than TH (=PH/N) (Y), the step S410 is followed by the step S411, where CNT is counted up by "1". In contrast, in the case where, in the step S410, it is determined that ION is larger than TH (=PH/N) (N), the step 410 is followed by the step S415, where CNT is counted down by "2", and then the internal-combustion-engine combustion state detecting apparatus becomes ready for the next processing cycle. The step S411 is followed by the step S412, where it is determined whether or not CNT is the same as or larger than the comparison value (referred to as CD, hereinafter) of an ending detection counter; in the case where CNT is the same as or larger than CD, the step S412 is followed by the step S413, where it is determined that the ion signal has ended and an ending timing (referred to as DP, hereinafter) is obtained, and then the step S412 is followed by the step S414, where FLG is set to "2"; after that, the internal-combustion-engine combustion state detecting apparatus becomes ready for the next processing cycle.

When, after DP is obtained, FLG is set to "2" in the step S414, the results of the determinations in the steps S401 and S408 in the following processing cycle become No (N), then the step S408 is followed by the step S416. In FIG. 416, it is determined whether or not DP is advanced in terms of the rotation angle of the crankshaft 50 with respect to CBT for diagnosing a combustion state, i.e., whether or not DP is the same as or smaller than CBT.

In this situation, as represented in FIG. 3, CBT is set in such a way as to be advanced in terms of the rotation angle of the crankshaft 50 with respect to the timing 312 when the ion signal becomes the same as or smaller than TH (=PH/N) in the case where ignition is normally performed at the first ignition timing 304 and the inflammable fuel-air mixture normally burns. CBT may be a map value based on a crank angle for each driving condition, or may be set as a relative timing with respect to the main ignition timing 304.

In the case where it is determined in the step S416 that DP is smaller than CBT, i.e., the ending timing of the ion signal is advanced in terms of the rotation angle of the crankshaft 50 with respect to the comparison timing (Y), the step S416 is followed by the step S417, where it is determined that combustion has abnormally been performed. In contrast, in the case where it is determined in the step S416 that DP is not smaller than CBT, i.e., DP is delayed in terms of the rotation angle of the crankshaft 50 with respect to CBT (N), the step S416 is followed by the step S418, where it is determined that combustion has normally been performed.

Heretofore, the operation of an internal-combustion-engine combustion state detecting apparatus according to Embodiment 1 of the present invention has been explained. Abnormal combustion is likely to occur at a specific crank angle. Accordingly, in the case where the first ignition timing 304, which is a main ignition timing, is far advanced in terms of the rotation angle with respect to the specific crank angle, the inflammable fuel-air mixture are burnt out through combustion caused by the ignition plug, before abnormal combustion occurs. Therefore, under such circumstances, it is not required to continue the combustion diagnosis more than necessary; in the case where the first ignition timing 304 is more advanced than a predetermined crank angle, for example, a crank angle that is 15° CA (a map value for each driving condition may be adopted) advanced from the top dead center, the combustion diagnosis is prohibited. In such a way as described above, the processing load can be reduced, whereby unnecessary, erroneous detection or erroneous operation can be prevented.

In the foregoing internal-combustion-engine combustion state detecting apparatus according to Embodiment 1 of the present invention, because combustion diagnosis can accurately be performed, target engine efficiency can be obtained, whereby the internal-combustion-engine combustion state detecting apparatus can contribute to the fuel depletion problem and to the environmental conservation. The primary current supply command is generated several times during a single compression-to-combustion cycle of an internal combustion engine; therefore, the detection accuracy for abnormal combustion can be raised.

Moreover, in an internal-combustion-engine combustion state detecting apparatus according to Embodiment 1 of the present invention, the ending timing device is configured in such a way as to be provided with an occurrence detection device for detecting the occurrence of an ion signal and not to detect the ending timing of the ion signal unless the ion signal occurs; therefore, erroneous detection of a combustion state can be prevented.

Moreover, in an internal-combustion-engine combustion state detecting apparatus according to Embodiment 1 of the present invention, there is provided a masking device that masks an electric quantity at a timing close to the energization starting timing when supply of a primary current to the ignition coil device provided in an ignition device is started and an electric quantity at a timing close to the ignition timing when the primary current is shut off and ignition is performed, and the ending timing is detected based on an electric quantity other than the masked electric quantity; therefore, erroneous detection of a combustion state can be prevented.

Still moreover, in an internal-combustion-engine combustion state detecting apparatus according to Embodiment 1 of the present invention, there is provided a level comparison device that sets a comparison level to be compared with the electric quantity, and as the ending timing of the electric quantity, there is adopted the timing when the electric quantity becomes lower than the set comparison level; therefore, abnormal combustion can be detected.

Furthermore, in an internal-combustion-engine combustion state detecting apparatus according to Embodiment 1 of the present invention, the level comparison device sets a comparison level in accordance with the peak hold value of the electric quantity; therefore, the number of matching man-hours can largely be reduced.

Still moreover, in an internal-combustion-engine combustion state detecting apparatus according to Embodiment 1 of the present invention, wherein the comparison timing device sets the comparison timing as a timing relative to an ignition timing based on a predetermined ignition signal; therefore, the number of matching man-hours can largely be reduced.

Moreover, in an internal-combustion-engine combustion state detecting apparatus according to Embodiment 1 of the present invention, in the case where the ignition timing based on the predetermined ignition signal is advanced in terms of the rotation angle of the crankshaft with respect to a predetermined ignition timing, the combustion diagnosis device prohibits the diagnosis of a combustion state; therefore, erroneous diagnosis of a combustion state can be prevented.

Still moreover, in an internal-combustion-engine combustion state detecting apparatus according to Embodiment 1 of the present invention, the combustion diagnosis device is provided with a leakage diagnosis device that determines whether or not there exists leakage of energy that is applied across the electrodes of an ignition plug in order to detect an ion, and in the case where the leakage diagnosis device determines that there exists leakage that exceeds a predetermined level, the diagnosis of a combustion state is prohibited; therefore, erroneous diagnosis of a combustion state caused by leakage can be prevented.

Furthermore, in an internal-combustion-engine combustion state detecting apparatus according to Embodiment 1 of the present invention, the combustion diagnosis device is provided with a foreign material diagnosis device that determines whether or not there exists a foreign material, in the inflammable fuel-air mixture, that makes an electric quantity based on an ion increase, and in the case where the foreign material diagnosis device determines that there exists a foreign material to the point where the amount thereof exceeds a predetermined amount, the diagnosis of a combustion state is prohibited; therefore, erroneous diagnosis of a combustion state caused by a foreign material can be prevented.

An internal-combustion-engine combustion state detecting apparatus according to the present invention is mounted on a vehicle, a two-wheeled vehicle, an outboard engine, a special machine, or the like utilizing an internal combustion engine, and makes it possible to efficiently operate the internal combustion engine, so that it can contribute to solving the fuel depletion problem and to the environmental conservation.

Various modifications and alterations of this invention will be apparent to those skilled in the art without departing from the scope and spirit of this invention, and it should be understood that this is not limited to the illustrative embodiments set forth herein.

What is claimed is:

1. An internal-combustion-engine combustion state detecting apparatus comprising:
   an ignition device that generates a plurality of ignition signals during a single compression stroke or power stroke of an internal combustion engine so as to ignite and burn an inflammable fuel-air mixture taken in into a combustion chamber in a cylinder of the internal combustion engine;

an ion detection device that is provided in the ignition device and detects an electric quantity based on an ion that occurs in the combustion chamber due to combustion of the fuel-air mixture;

an ending timing detection device that detects an ending timing of the detected electric quantity;

a comparison timing device that sets a comparison timing;

a combustion diagnosis device that compares the detected ending timing with the set comparison timing and then diagnoses a combustion state of the internal combustion engine, based on the result of the comparison; and a level comparison device sets a comparison level in accordance with a peak hold value of the electric quantity, wherein the comparison timing is set in such a way as to be advanced in terms of the rotation angle of a crankshaft of the internal combustion engine with respect to the ending timing of an electric quantity based on an ion that occurs when ignition is performed normally through a predetermined ignition signal among the plurality of ignition signals, wherein combustion diagnosis device determines normal combustion occurs in response to the detected ending timing of the electrical quantity following the set comparison timing in terms of the rotation angle of a crankshaft of the internal combustion engine; and determines that abnormal combustion occurs in response to the detected ending timing preceding the set comparison timing in terms of the rotation angle of the crankshaft.

2. The internal-combustion-engine combustion state detecting apparatus according to claim 1, wherein the predetermined ignition signal is an ignition signal, among the plurality of ignition signals, that firstly occurs.

3. The internal-combustion-engine combustion state detecting apparatus according to claim 1, wherein the ending timing device is configured in such a way as to be provided with an occurrence detection device for detecting occurrence of the electric quantity and does not detect the ending timing of the detected electric quantity unless the occurrence detection device detects a first occurrence of the electric quantity.

4. The internal-combustion-engine combustion state detecting apparatus according to claim 1, wherein the ending timing device is provided with a masking device that masks the electric quantity at a timing close to an energization starting timing when supply of a primary current to an ignition coil device provided in the ignition device is started and the electric quantity at a timing close to an ignition timing when the primary current is shut off and the ignition is performed, and detects the ending timing, based on an electric quantity other than the masked electric quantity.

5. The internal-combustion-engine combustion state detecting apparatus according to claim 1, wherein the ending timing device is provided with the level comparison device that sets the comparison level to be compared with the electric quantity, and adopts a timing when the electric quantity becomes lower than the set comparison level, as the ending timing of the electric quantity.

6. The internal-combustion-engine combustion state detecting apparatus according to claim 1, wherein the comparison timing device sets the comparison timing as a timing relative to an ignition timing based on the predetermined ignition signal.

7. The internal-combustion-engine combustion state detecting apparatus according to claim 1, wherein, in the case where the ignition timing based on the predetermined ignition signal is advanced in terms of the rotation angle of the crankshaft with respect to a predetermined ignition timing, the combustion diagnosis device prohibits the diagnosis of a combustion state.

8. The internal-combustion-engine combustion state detecting apparatus according to claim 1, wherein the combustion diagnosis device is provided with a leakage diagnosis device that determines, in order to detect the ion, whether or not there exists leakage of energy that is applied across the electrodes of an ignition plug, and prohibits the diagnosis of a combustion state in the case where the leakage diagnosis device determines that there exists leakage to the point where the level thereof exceeds a predetermined level.

9. The internal-combustion-engine combustion state detecting apparatus according to claim 1, wherein the combustion diagnosis device is provided with a foreign material diagnosis device that determines whether or not there exists a foreign material, in the inflammable fuel-air mixture, that makes the electric quantity increase, and prohibits the diagnosis of a combustion state in the case where the foreign material diagnosis device determines that there exists the foreign material to the point where the amount thereof exceeds a predetermined amount.

10. The internal-combustion-engine combustion state detecting apparatus according to claim 1, wherein the comparison timing represents a time at a specific crank angle.

* * * * *